United States Patent
Mkrtchyan et al.

(10) Patent No.: US 9,575,156 B2
(45) Date of Patent: Feb. 21, 2017

(54) SPATIAL RECOGNITION OF RFID TAG PLACEMENT USING ANTENNA MULTIPLEXING

(71) Applicant: Disney Enterprises, Inc., Burbank, CA (US)

(72) Inventors: Armen Mkrtchyan, Glendale, CA (US); Artaches Haroutunian, Salt Lake City, UT (US); Robert Nelson, Salt Lake City, UT (US)

(73) Assignee: Disney Enterprises, Inc., Burbank, CA (US)

(*) Notice: Subject to any disclaimer, the term of this patent is extended or adjusted under 35 U.S.C. 154(b) by 524 days.

(21) Appl. No.: 13/886,987

(22) Filed: May 3, 2013

(65) Prior Publication Data
US 2014/0197991 A1 Jul. 17, 2014

Related U.S. Application Data

(60) Provisional application No. 61/752,932, filed on Jan. 15, 2013.

(51) Int. Cl.
*G01S 5/02* (2010.01)
*G06K 7/10* (2006.01)
*G01S 13/87* (2006.01)

(52) U.S. Cl.
CPC .............. *G01S 5/02* (2013.01); *G01S 13/878* (2013.01); *G06K 7/10356* (2013.01)

(58) Field of Classification Search
None
See application file for complete search history.

(56) References Cited

U.S. PATENT DOCUMENTS

| | | | |
|---|---|---|---|
| 4,831,331 A | 5/1989 | De et al. | 324/338 |
| 4,956,643 A | 9/1990 | Hahn, III et al. | 342/51 |
| 6,259,413 B1 | 7/2001 | Schmidt et al. | 343/742 |
| 6,472,947 B1 | 10/2002 | Zeitz | 333/17.1 |
| 6,903,656 B1* | 6/2005 | Lee | G06K 7/0008 340/10.1 |
| 6,914,570 B2 | 7/2005 | Asrani et al. | 343/702 |
| 7,265,731 B2 | 9/2007 | Vance et al. | 343/860 |
| 7,474,156 B2 | 1/2009 | Fujii | 330/295 |
| 7,501,912 B2 | 3/2009 | Jamneala et al. | 333/132 |
| 7,548,140 B2 | 6/2009 | Jamneala et al. | 333/189 |
| 8,115,638 B2 | 2/2012 | Sakama | 340/572.7 |
| 8,313,028 B2 | 11/2012 | Itay et al. | 235/440 |
| 8,416,024 B2 | 4/2013 | Fujii | 330/302 |
| 8,981,907 B1 | 3/2015 | Lavache | |
| 2004/0229698 A1* | 11/2004 | Lind | A63F 13/12 463/42 |
| 2005/0099343 A1 | 5/2005 | Asrani et al. | 343/702 |
| 2005/0125093 A1 | 6/2005 | Kikuchi et al. | 700/213 |
| 2006/0076401 A1* | 4/2006 | Frerking | G06K 7/0008 235/380 |
| 2006/0125602 A1* | 6/2006 | Posamentier | G06K 7/0008 340/10.3 |
| 2006/0125638 A1* | 6/2006 | Marino | G06K 7/0008 340/572.7 |

(Continued)

*Primary Examiner* — Mohamed Barakat
(74) *Attorney, Agent, or Firm* — Sheppard Mullin Richter & Hampton LLP

(57) ABSTRACT

A system to determine the placement of multiple RFID tags uses multiple antennae. The RF communication (or NFC) includes read and/or read/write communication with the RFID tags.

24 Claims, 5 Drawing Sheets

(56) References Cited

U.S. PATENT DOCUMENTS

| | | | |
|---|---|---|---|
| 2006/0139211 A1 | 6/2006 | Vance et al. | 343/700 |
| 2006/0202033 A1* | 9/2006 | Campero | G06K 7/0008 |
| | | | 235/436 |
| 2007/0008140 A1 | 1/2007 | Saarisalo et al. | 340/572.7 |
| 2007/0118335 A1 | 5/2007 | Andarawis et al. | 702/188 |
| 2008/0042778 A1 | 2/2008 | Jamneala et al. | 333/133 |
| 2008/0079650 A1 | 4/2008 | Constantinidis et al. | 343/858 |
| 2008/0186140 A1 | 8/2008 | Kuwako et al. | 340/10.1 |
| 2008/0224826 A1 | 9/2008 | Kuwako et al. | 340/10.1 |
| 2008/0252398 A1 | 10/2008 | Jamneala et al. | 333/189 |
| 2008/0290948 A1 | 11/2008 | Fujii | 330/295 |
| 2009/0033467 A1 | 2/2009 | Finocchiaro et al. | 340/10.1 |
| 2009/0072949 A1* | 3/2009 | Fukuda | H01Q 1/2216 |
| | | | 340/10.1 |
| 2011/0198398 A1* | 8/2011 | Itay | G06K 7/10356 |
| | | | 235/439 |
| 2012/0182084 A1 | 7/2012 | Peng et al. | 333/100 |
| 2012/0268210 A1 | 10/2012 | Fujii | 330/277 |
| 2014/0197991 A1 | 7/2014 | Mkrtchyan | |

* cited by examiner

SPATIAL RECOGNITION OF RFID TAG PLACEMENT USING ANTENNA MULTIPLEXING

FIELD OF THE DISCLOSURE

The present invention relates generally to wireless communications, and more particularly, to spatial recognition of RFID device placement by RF communications using multiple antennae.

BACKGROUND

Radio-frequency identification (RFID) is based on wireless, non-contact, radio-frequency (RF) electromagnetic fields to transfer data from one device (e.g., a tag) to another device such as a reader. RFID chips or tags act as transponders and can receive a radio signal sent by the tag reader or interrogator, and can respond by transmitting its unique ID code back to the reader. When given unique codes (or a unique code for a class of goods), RFID tags can uniquely identify the item to which they are attached. Accordingly, RFID tags can be used for identification and tracking of goods using wireless proximity sensing.

Most RFID tags are powered by the radio signal from the reader. The radio signal from the reader induces a current in one or more coils within the RFID tag. This current can be used to power the tag. This current may power electronic circuitry of the tag. Because RFID tags may be small, light-weight, and low cost, they may be suitable for various functionalities and/or tasks, including but not limited to tracking items, collecting tolls automatically, providing machine readable items and/or documents, and/or other tasks. For example, RFID tags can be used to track location, shipment and delivery of items, livestock and other animals.

SUMMARY

One aspect of the disclosure relates to a system to determine spatial placement of one or more radio-frequency identification tags. In some implementations, determining spatial placement includes determining proximity to one or more antennae. For example, the system may be configured to determine which antenna is closest to a particular RFID tag.

The system comprises a radio-frequency reader circuit configured to establish radio-frequency communication by controlling an antenna-matching network, an antenna-selecting module configured to selectively establish electrical coupling to receive information through a first antenna having a first location or through a second antenna having a second location, and a controller configured to control the antenna-selecting module to determine whether the first RFID tag is closer to the first location or the second location. In some implementations, the antenna-selecting module includes an antenna multiplexer. In some implementations, the antenna-selecting module includes a first and second alternating-current shorting circuits to selectively enable radio-frequency communication via an antenna-matching network. The first alternating-current shorting circuit may be configured to selectively establish electrical coupling for alternating current between the antenna-matching network and the first antenna. The second alternating-current shorting circuit may be configured to selectively establish electrical coupling for alternating current between the antenna-matching network and the second antenna.

Another aspect of the disclosure related to a computer-implemented method for determining spatial placement of one or more radio-frequency identification tags. The method comprises establishing radio-frequency communication by controlling an antenna-matching network; selectively establishing electrical coupling for alternating current between the antenna-matching network and a first antenna or a second antenna; and selectively enabling radio-frequency communication via the antenna-matching network.

DETAILED DESCRIPTION

The typical radio-frequency identification (RFID) system comprises, by way of non-limiting example, two parts: an RFID interrogator, and an RFID tag. As used herein, the terms "RF" and "RFID" may be used to refer to "radio-frequency" and "radio-frequency identification," respectively. The term "RF communication" may be used interchangeably with the terms "Near Field Communication" or "NFC" herein. The terms "RFID interrogator" and "RFID reader" may be used interchangeably. The RFID interrogator is a reader/writer circuit that transmits electromagnetic radio-frequency (RF) signals at a given frequency for detection by and/or information transfer to the RFID tag. "RF signals" may also be referred to as "alternating current signals" or "AC signals" herein. The transmitted signal is received, modulated, and transmitted by the RFID tag. The RFID interrogator receives the modulated signal from the RFID tag and deciphers the information encoded thereon. The RFID tag may be placed on or implanted within an item or object, e.g. to be tracked. The RFID tag may store information and/or the identity of the item on which it is placed.

Once the RFID tag comes into proximity of a signal at the right frequency, a current may be induced in one or more coils within the tag. The tag is in a sense activated. Logic (e.g. electronic circuitry) inside the tag modulates the signal and transmits the modulated signal. The transmitted modulated signal may be received by the interrogator. The modulated signal may represent a bit sequence, which includes desired information and/or the identity of the item.

Figure 1:
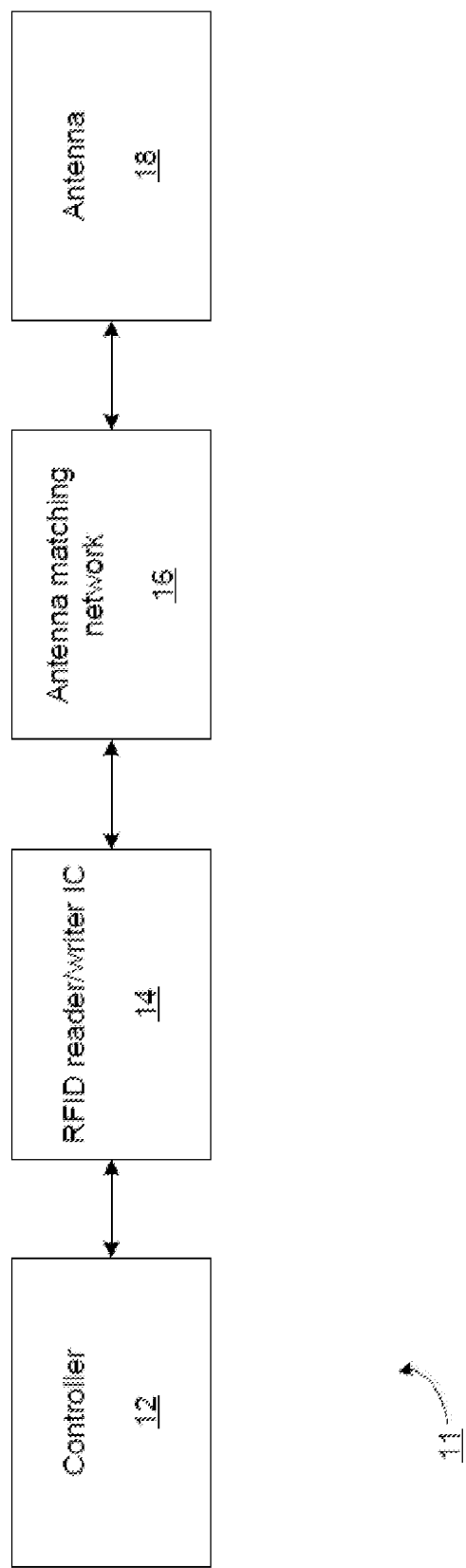
FIG. 1 illustrates an RFID interrogator.

FIG. 1 shows an RFID interrogator 11. RFID interrogator 11 may include a microcontroller unit (MCU) 12 and/or other controller 12, an RFID reader/writer IC 14, an antenna-matching network 16, an antenna 18 for wireless communications, and/or other components. As used herein, "communication" may be in multiple directions unless specifically noted otherwise. For example, wireless communication using a particular antenna may include reading information from an individual RFID tag as well as writing information to the individual RFID tag. Controller 12 may be implemented using a general-purpose processor programmed to cause the system to perform functions described herein. The functions may include generating an RF signal to interrogate one or more RFID tags, detecting and/or receiving modulated signals from one or more RFID tags, interpreting the signal received from the RFID tags, and other functions appropriate to an RFID interrogator.

RFID reader/writer IC 14 may include transmit and receive circuitry to transmit signals to one or more RFID tags (e.g. a transmitter) and to receive signals from the one or more RFID tags (e.g. a receiver). An RFID reader/writer IC may be referred to as a radio-frequency reader circuit, and/or a radio-frequency reader-writer circuit, depending on the implementation and/or functionality in context. RFID reader/writer IC 14 may include demodulation circuitry to demodulate a modulated RFID signal and detect or decipher the information modulated thereon. RFID reader/writer IC 14 may be configured to establish radio-frequency (RF) communication (or NFC) by controlling antenna-matching network 16.

Antenna-matching network 16 may be used to match antenna 18 to a transmitter within RFID reader/writer IC 14. Matching antenna 18 may improve and/or optimize transmission and/or reception using antenna 18. Matching may be based on electromagnetic properties of antenna 18. Matching may be accomplished by matching the input fields of antenna 18 to maximize and/or increase the power transfer and/or minimize reflections from antenna 18. Impedance matching to minimize reflections may be achieved by changing the effective load impedance so that it matches the impedance of the transmitter. Alternatively, and/or simultaneously, complex conjugate matching may be used to increase power transfer by adding a reactive component to the load that is opposite in sign of a reactive component of the source. The source may for example be antenna 18. This reactive component may include one or more capacitors and/or inductors. Matching may be used to find and/or use the resonant frequency of an antenna (or a range in which the antenna is deemed to be sufficiently resonant to effectively establish communication). In other words, by virtue of using antenna-matching network 16 antenna 18 is driven at or near resonance. In some implementations, exact resonance may not be needed, as long as the operating frequency is sufficiently close to the resonant frequency. Sufficiently close may be defined as within 90%, 95%, 96%, 97%, 98%, 99%, 99.5%, 99.9%, and/or within another suitable percentage of the resonant frequency.

Difficulties may arise when RFID interrogator 11 is intended to communicate with multiple RFID tags at once. For example, in some implementations and/or applications, an RFID interrogator may be expected to communicate with multiple RFID tags. For example, automated grocery store checkout may use RFID tags to "scan" or process multiple items in a shopping cart in a brief span of time; tracking multiple medicine containers in the hospital pharmacy in a brief span of time; and tracking livestock, just to name a few. Neither the duplicated costs nor the physical dimensions and/or scale of known techniques to communicate with multiple RFID tags at once (or within a short amount of time) would be practical for use with personal electronics, such as game systems. For example, systems designed for inventory tracking may operate on a scale ranging from tens of meters to one or more kilometers.

In the videogame industry, the need to identify and track multiple RFID tags at the same time may arise. For example, a video game may use RFID tags to identify one or more players, tokens, bases, world modifiers, and/or to other game-related resources and/or information. For example, a video game may use an RFID tag to associate one or more possessions with one or more players, tokens, bases, etc. Accordingly, a player's token (indicating, for example, his or her identity) may include an RFID tag identifying that token. Game-related, and possibly virtual, possessions such as weapons, cash, or other (possibly player-specific) resources may likewise be accumulated and identified by RFID tags.

In some implementations, the function of two or more RFID tags may be distinguished by placement, position, and/or location. For example, the RFID tag in a first location may be associated with a first player, whereas a different RFID tag in a second location may be associated with a second player. Accordingly, for a video game system to determine and/or recognize one or more tokens in one or more relative positions and/or locations, the video game system may need to be able to communicate with multiple RFID tags simultaneously (or at least in rapid succession). The video game system may further need to determine the spatial placement, order, and/or physical location of multiple RFID tags. The granularity and/or precision obtained may be in the range of one or more centimeters, less than about an inch, about an inch, between about one inch and two inches, and/or another suitable distance.

In some implementations, multiple RFID tags may be used for the same video game to identify multiple players. For example, individual RFID tags may be included in individual player tokens. The term "RFID token" may be used interchangeably with the term "token". The video game system may need to distinguish between individual RFID tags and/or individual players. For example, a first player may need to be distinguished from a second player. By way of non-limiting example, the game-related resources and/or information may be player-specific such that it matters which RFID tag is associated with the first player and which RFID tag is associated with the second player. Note that the notion of using two players is exemplary and in no way intended to be limiting. Some implementations may use three, four, or more than four players at once.

Figure 3:
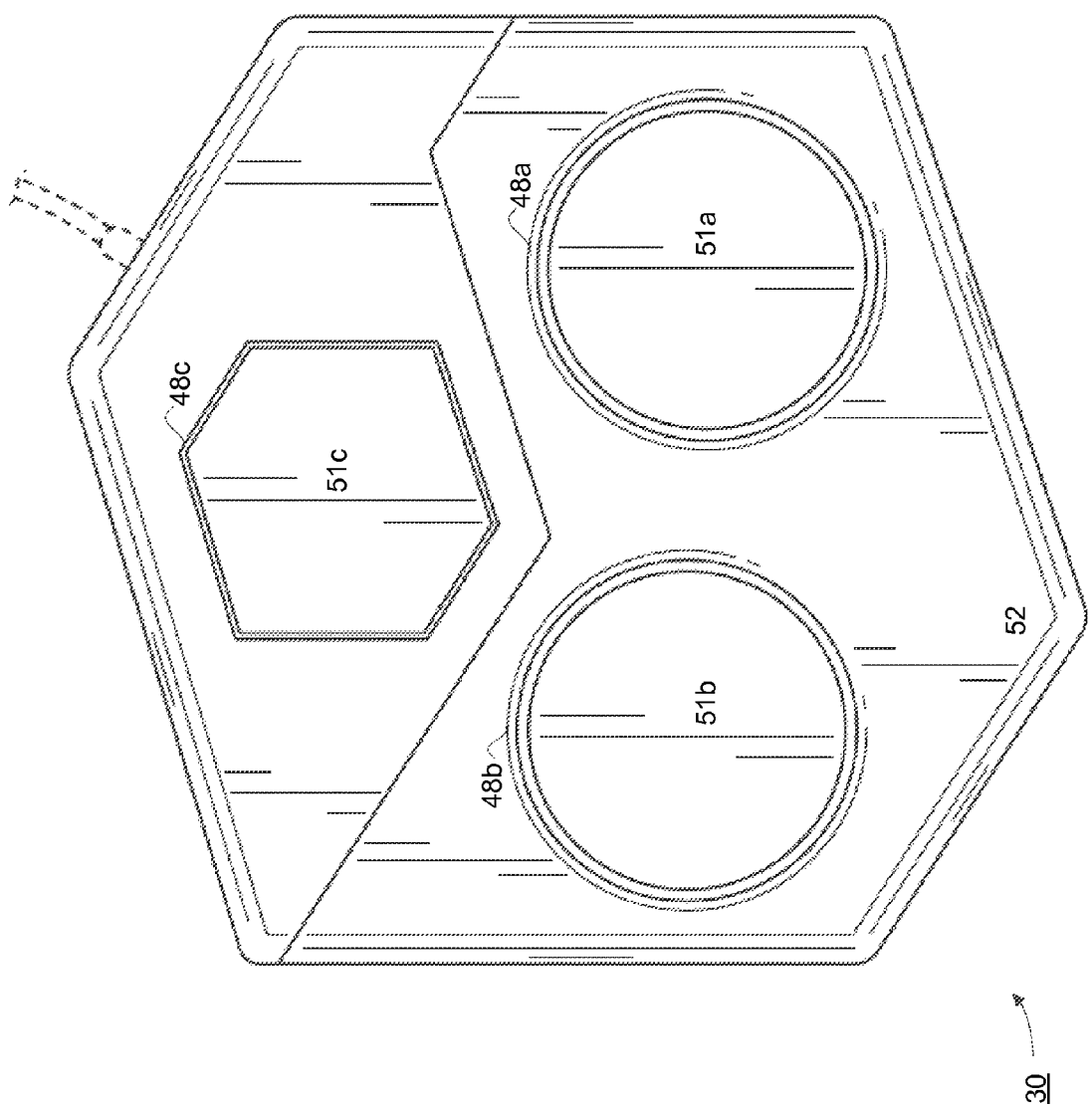
FIGS. 3-4 illustrate systems for spatial recognition of RFID tag placement in accordance with one or more implementations.

By way of illustration, FIG. 3 illustrates a top-view of a reader platform 30 for spatial recognition of RFID tag placement in accordance with one or more implementations. Reader platform 30 may be implemented as a (computer) game peripheral. For example, reader platform 30 may include a USB plug (not shown) to support communication with a computing platform. Reader platform 30 may include a base 52, token-retainment structures 51*a*, 51*b*, and 51*c*, a first antenna 48*a*, a second antenna 48*b*, a third antenna 48*c*, a controller (not shown), one or more RFID reader/writer ICs (not shown), one or more antenna-matching networks (not shown), and/or other components. The hexagonal shape of base 52 is merely exemplary, and not intended to be limiting in any way. The number of depicted token-retainment structures and antennae in any of the figures is exemplary and not intended to be limiting in any way. Token-retainment structures 51*a*, 51*b*, and 51*c* are depicted as indentations, slots, notches, and/or similar structures suitable for placement and/or retainment of a FRID tag or token. As depicted in FIG. 3, first antenna 48*a* is placed at, near, and/or around token-retainment structure 51*a*, second antenna 48*b* is placed at, near, and/or around token-retainment structure 51*b*, and third antenna 48*c* is placed at, near, and/or around token-retainment structure 51*c*.

Base 52 of reader platform 30 in FIG. 3 may be configured to support (physically) one or more of the controller, one or more antenna-matching networks, one or more RFID reader/writer ICs, one or more RFID tokens, and/or other components of reader platform 30. For example, the controller may be the same as or similar to controller 12 of FIG. 1 and/or controllers described in this disclosure. For example, the one or more antenna-matching networks may be the same as or similar to antenna-matching network 16 of FIG. 1 and/or antenna-matching networks described elsewhere in this disclosure. For example, the one or more RFID reader/writer ICs may be the same as or similar to RFID reader/writer IC 14 of FIG. 1 and/or RFID reader/writer ICs described elsewhere in this disclosure. Reader platform 30 may include the same or similar components and/or functionality as RFID interrogator 11 of FIG. 1 and/or RFID interrogators described elsewhere in this disclosure. Note that reader platform 30 may be used to establish two-way communication with RFID tokens.

Figure 4:
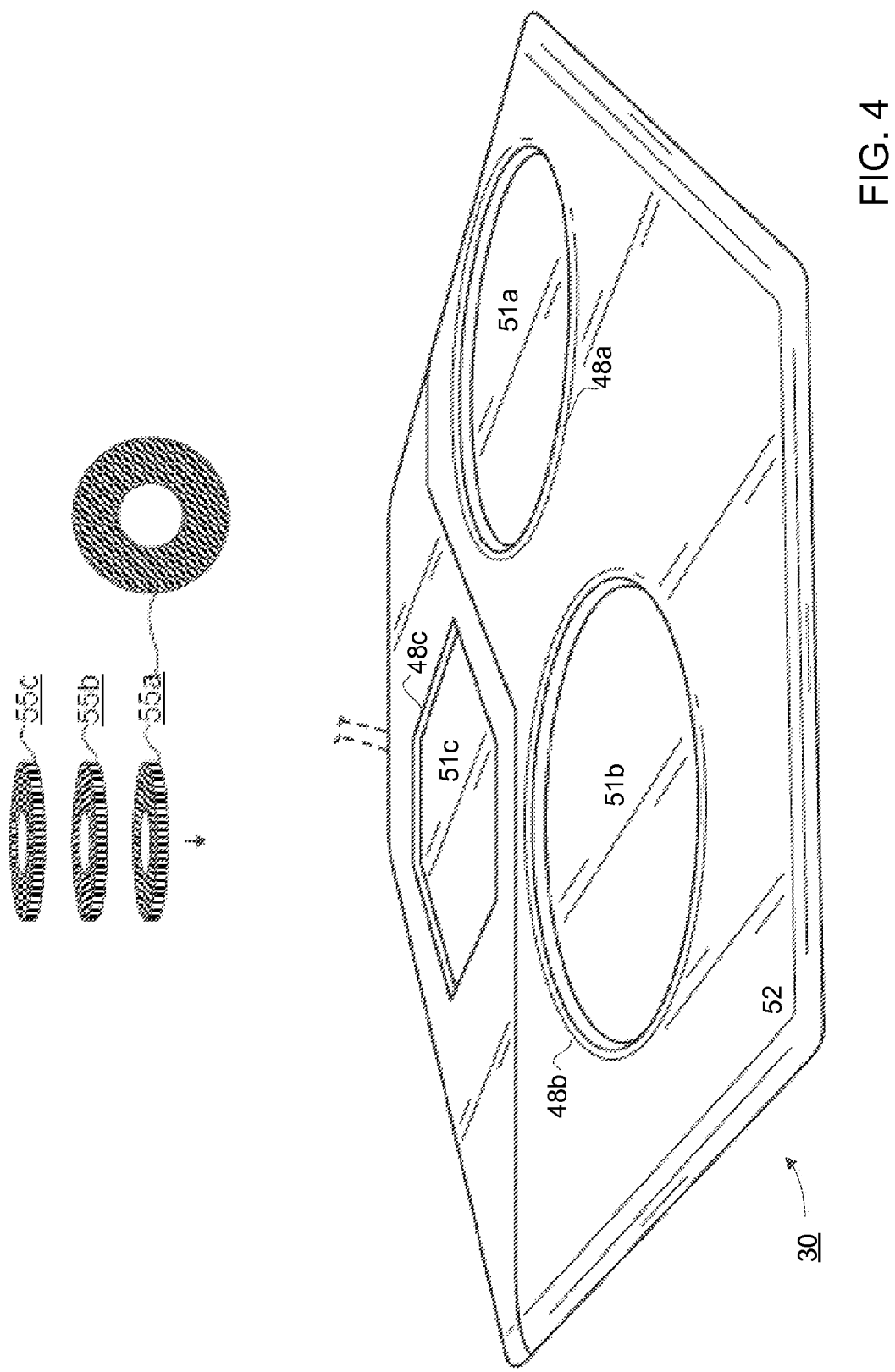

FIG. 4 illustrates an isometric view of reader platform 30 for spatial recognition of RFID tag placement in accordance with one or more implementations. FIG. 4 further illustrates exemplary RFID tokens 55a, 55b, and 55c. The shapes of individual RFID tokens are not intended to be limited in any way by the depictions in this or any other figure. In some implementations, RFID tokens may be shaped as figurines. First RFID token 55a is depicted in top and isometric view. Assume that first token 55a is associated with a player, second token 55b is associated with another player, and third token 55c is associated with a game-related resource. Individual RFID tokens may be configured to fit and/or match physically in, on, and/or near reader platform 30 or components thereof, such as, by way of non-limiting example, token-retainment structures 51a, 51b, and 51c. Token-retainment structure may be configured to support and/or retain one or more RFID tokens. In some implementations, one or more RFID tokens may be retained and/or held in place on reader platform 30, base 52, and/or other components of reader platform 30 by virtue of physically matching dimensions. As depicted in FIG. 3, first RFID token 55a may be placed on token-retainment structure 51a of reader platform 30. Second RFID token 55b may be placed on second token-retainment structure 51b. Third RFID token 55c may be placed on third token-retainment structure 51c. In some implementations, one or more of first antenna 48a, second antenna 48b, and/or third antenna 48c may be integrated, embedded, and/or otherwise combined in reader platform 30.

Reader platform 30 in FIG. 3 may be configured to determine and/or recognize the spatial placement (and/or relative order) of multiple RFID tags. As depicted in FIG. 3, reader platform 30 may be configured to determine which RFID token is placed on reader platform 30 first (and which RFID token is placed second and/or third). For example, first RFID token 55a may be placed in position and/or active engagement first. Second RFID token 55b may be placed in position and/or active engagement secondly. Third RFID token 55c may be placed in position and/or active engagement thirdly.

Reader platform 30 may establish (one-way or two-way) communication through first antenna 48a with first RFID token 55a. Reader platform 30 may establish (one-way or two-way) communication through second antenna 48b with second RFID token 55b. Reader platform 30 may establish (one-way or two-way) communication through third antenna 48c with third RFID token 55c. By virtue of the spatial placement of the first, second, and third RFID token, game-related specifics may be configured accordingly. For example, the player associated with first RFID token 55a may be determined to be the first player in the game. The player associated with second RFID token 55b may be determined to be the second player in the game. For example, by virtue of the placement and/or order of the first, second, and third RFID token, the game-related resources associated with third RFID token 55c may benefit the second player, be attributed to the second player, and/or otherwise be applied in a way that differs between the first and second player.

If an RFID interrogator is intended to communicate with multiple different RFID tags at the same time (or within a short amount of time), multiple antennae may be required. In some implementations, an RFID interrogator may support communications with multiple RFID tags by using multiple RFID reader/writer ICs, multiple antenna-matching networks, multiple antennae, and/or other duplicated components. Because of the duplication of components in this design, it tends to be relatively costly. This is especially true as additional communication channels are added to communicate with additional RFID tags.

In some implementations, in an attempt to avoid duplication of the reader/writer IC, an antenna multiplexer is provided to communicate with multiple antennae (e.g. a first antenna and a second antenna). Such implementations may require a high degree of precision with multiple antenna-matching networks, which may lead to greater costs and a less robust operation. To overcome and/or reduce the effects of an antenna multiplexer, antenna-shorting circuits may be provided for individual antennae in a multi-antenna RFID interrogator. When the RFID interrogator intends to communicate with an RFID tag on one of the multiple antennae, other antennae may be shorted by one or more shorting circuits. As a result or shorting, unwanted signals may be not transmitted (and/or at least not transmitted to the same extent or having the same energy) by the shorted antennae. The shorted antennae may cause no or reduced interference with a (non-shorted) antenna being used for communications.

A shorting circuit may include one or more of a switch, one or more radio-frequency relays, one or more capacitors, and/or other components. A shorting circuit may be configured to short alternating signals, e.g. alternating current. Shorting may not need to be perfect or complete. Shorting signals at the particular frequency of intended use may be sufficient. The shorting circuits may not need to short, e.g., direct current. In some implementations, a shorting circuit may be considered a circuit that intentionally de-tunes the connection between an antenna-matching network and an antenna. De-tuning may change the resonant frequency of the antenna-matching network. De-tuning may cause the amplitude of the AC signal to be reduced. De-tuning may have the described effect of shorting. For example, RF relays may be used to provide an RF short. Alternatively and/or simultaneously, one or more RF relay switches may be used to switch one or more unwanted signals into dummy loads. Other switching mechanisms can be used to short one or more antennae.

Figure 2:
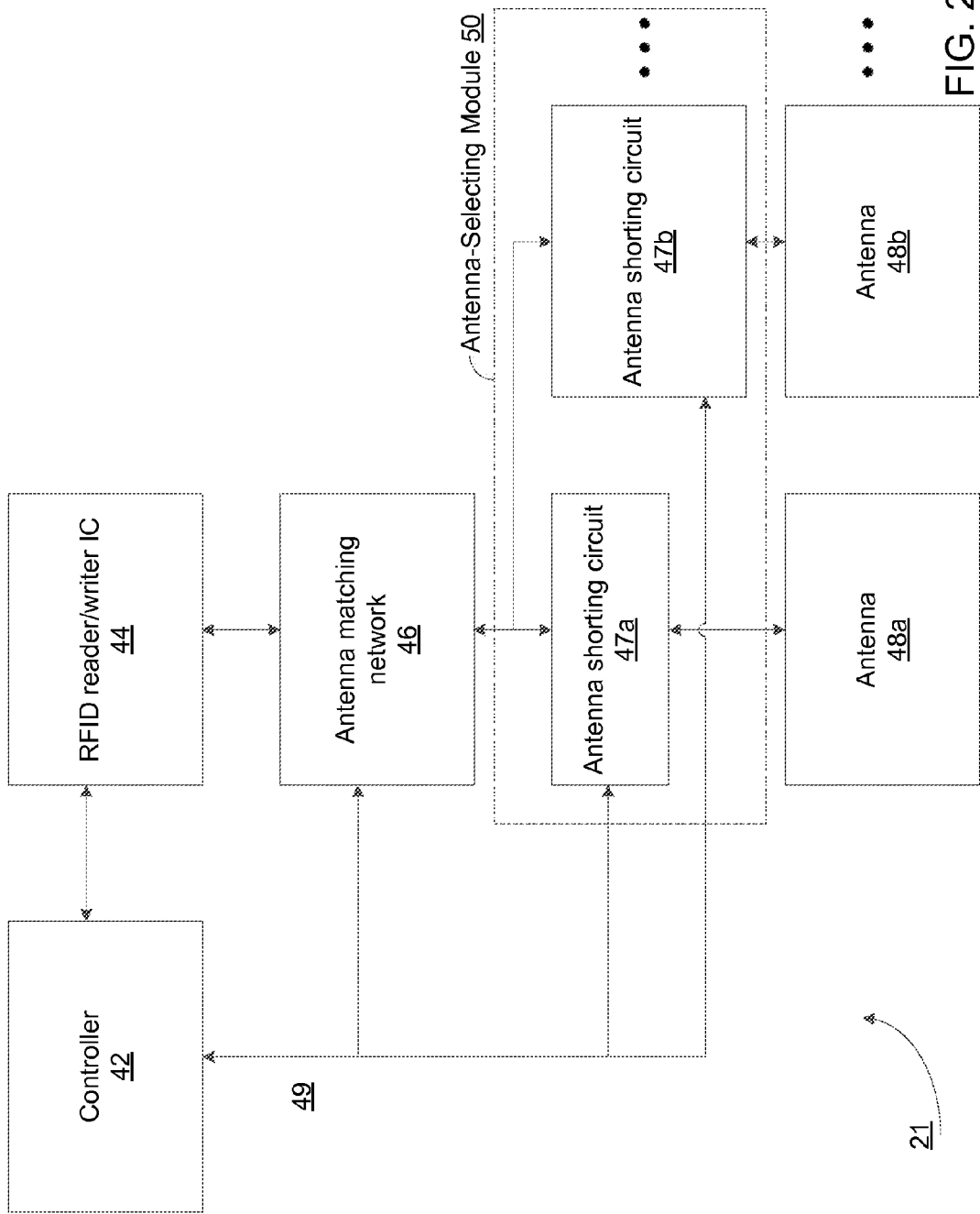
FIG. 2 illustrates an example of a system to multiplex antennae for communication in accordance with one or more implementations.

FIG. 2 schematically illustrates an exemplary implementation of an RFID interrogator 21 configured to communicate with multiple RFID tags in accordance with one or more implementations described herein. Although FIG. 2 is illustrated as multiplexing two antennae (as depicted: first antenna 48a and second antenna 48b) for communication with two RFID tags (not shown), this is not intended to be limiting in any way. By virtue of using one or more antenna-shorting circuits, RFID interrogators may use three or more antennae. The number of shorting circuits, matching networks and antennae may not need to match.

Referring to FIG. 2, RFID interrogator 21 includes a controller 42 to control the operations of an RFID reader/writer IC 44 to communicate with multiple RFID tags (not shown), an antenna-matching network 46, an antenna-selecting module 50, a first antenna 48*a*, a second antenna 48*b*, and/or other components. As depicted, in some implementations, antenna-selecting module 50 may include a first antenna-shorting circuit 47*a* and a second antenna-shorting circuit 47*b*. Controller 42 may be configured to control antenna-matching network 46, first antenna-shorting circuit 47*a*, and second antenna-shorting circuit 47*b*, for example through a control signal 49. As illustrated in this example, because the unused antennae can be shorted to avoid (at least most of the) interference and other unwanted effects and/or problems, this implementation can be implemented using a single controller 42 and a single RFID reader/writer IC 44. In some implementations, multiple controllers and/or multiple RFID reader/writer IC's may be used.

Different antennae may have different themes, reactive properties, and/or electromagnetic characteristics. Separate matching networks or separate configurations of the same matching network may be provided for one or more antennae. However, because an antenna multiplexer is not included or needed in FIG. 2, one or more relatively simple antenna-matching networks may be used. Antenna-matching network 46 depicted in FIG. 2 may not need to compensate for the effects of an antenna multiplexer.

RFID interrogator 21 in FIG. 2 may step or sweep through multiple antennae to communicate with multiple RFID tags. Stepping or sweeping may be performed one antenna at a time. Controller 42 may be programmed with a particular or predetermined sweep order in which to step through the antennae. Thus, communication with the various individual RFID tags may be established one by one. Controller 42 may be configured to control, in a coordinated fashion, RFID reader/writer IC 44 and/or antenna-shorting circuits 47*a*-47*b* so that RFID interrogator 21 is communicating with the intended RFID tag through read operations and/or read/write operations, as appropriate for the type of RFID tag and/or the application.

In some implementations that include three or more antenna, multiple antennae may be shorted at the same time. When one or more antennae are shorted, an antenna that is intended for use in communicating with an RFID tag may not be shorted. In some implementations, only one antenna is not shorted (at a particular time) during communication with an RFID tag. As illustrated by control line 49 in FIG. 2, selectively shorting one or more antennae may be controlled by controller 42. For example, one or more RF relays may be controlled by the controller. Implementations may include signal lines on a bus, dedicated lines, and/or other techniques to implement control line 49.

In some implementations, a particular antenna may be configured to communicate with multiple RFID tags in different locations and/or positions at once (or within a short amount of time). By measuring signal-strength for the communications (by different antennae) with a particular RFID tag, the system may determine the relative position and/or proximity of the RFID tag to the different antennae.

By way of illustration, in FIG. 3, reader platform 30 may be configured to selectively short second antenna 48*b* and third antenna 48*c* when establishing communication (e.g. NFC) through first antenna 48*a*. Subsequently, reader platform 30 may be configured to selectively short first antenna 48*a* and third antenna 48*c* when establishing communication through second antenna 48*b*. Subsequently, read platform 30 may be configured to selectively short first antenna 48*a* and second antenna 48*b* when establishing communication through third antenna 48*c*. Such a sweep may occur in rapid succession, e.g. within about 10 ms, within about 0.1 second, within about 1 second, and/or within another suitable period.

Referring to FIG. 2, RFID reader/writer IC 44 may be used to control one or more antenna-shorting circuits to short the appropriate antennae at the appropriate time. For example, RFID reader/writer IC 44 may control one or more control lines (or a bus, etc.) that control one or more antenna-shorting circuits as described elsewhere.

Controller 42 may be configured to control RFID reader/writer IC 44. Controller 42 may be configured to control RFID reader/writer IC 44 to short elements or circuits within RFID interrogator 21 to effectively sweep through a plurality of antennae. By virtue of using one or more implementations described in this disclosure, RFID interrogator 21 may interrogate, identify, and/or obtain information from one or more RFID tags. Various scanning algorithms may be used to scan the one or more RFID tags and collect information therefrom. For example, controller 42 may control a one-by-one scanning of individual ones of the RFID tags in a designated set of RFID tags, e.g. scanning one at a time. As one antenna is brought online (e.g. its short removed), one or more other antennae may be shorted in a manner as described in this disclosure. Scanning may be accomplished in any of a number of scan patterns as may be appropriate for a given application.

An antenna may be shorted anywhere along the length of the antenna. In some implementations, an antenna may be shorted at its feed for ease of implementation. Other techniques may be used to change the electrical length of an antenna. Other techniques may be used to disrupt the resonance of an antenna. By virtue of using the techniques described herein, one or more particular antennae may selectively be controlled such that it or they do not interfere with one or more other antennae during communication of those other antennae.

Referring to FIG. 3, in some implementations, token-retainment structures may include a slot, an indentation, a depression, and/or another suitable structure. In some implementations, first antenna 48*a* may be used for communication that pertains to a first user of reader platform 30. Second antenna 48*b* may be used for communication that pertains to a second user of reader platform 30. It is noted that token-retainment structures may have different sizes and/or shapes. The depiction in FIG. 3 is exemplary and not intended to be limiting in any way. In some implementations, an RFID tag may be placed between two or more token-retainment structures such that two or more antennae are equally close (at least within the margins of the precision of the spatial determination as described herein). The system may detect such a condition or occurrence as improper and/or erroneous. For example, the system may alert a user to remedy such an issue by placing RFID tags in or near a token-retainment structure properly.

In some implementations, a single RFID token may be placed on reader platform 30. By attempting to establish communication, e.g. in sequential order, with individual ones of the multiple antennae, the system may determine which antenna is closest to the RFID token. In some implementations, a single attempt that uses the antenna closest to the RFID token provides sufficient assurance about the position of the RFID token.

Reader platform 30 may be about 3, about 4, about 5, about 6, about 7, about 8, about 9, or about 10 inches long and/or wide. In some implementations, reader platform 30 may include 4, 5, 6, or more antennae that may be multiplexed by virtue of the disclosure described herein.

The present invention, in accordance with one or more various implementations, is described above in detail with reference to the accompanying figures. The drawings are provided for purposes of illustration only and merely depict exemplary implementations. These drawings are provided to facilitate the reader's understanding of the systems and methods described herein and shall not be considered limiting of the breadth, scope, or applicability of any of the claims.

Although the systems and methods set forth herein are described in terms of various exemplary implementations and implementations, it should be understood that the various features, aspects and functionality described in one or more of the individual implementations are not limited in their applicability to the particular implementation with which they are described, but instead can be applied, alone or in various combinations, to one or more of the other implementations, whether or not such implementations are described and whether or not such features are presented as being a part of a described implementation. Thus, the breadth and scope of the present disclosure should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various implementations set forth herein are described in terms of exemplary block diagrams, flow charts, and/or other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

Controller 42 may be configured to provide information-processing capabilities in RFID interrogator 21. As such, controller 42 may include one or more of a digital processor, an analog processor, a digital circuit designed to process information, an analog circuit designed to process information, a state machine, and/or other mechanisms for electronically processing information. Although controller 42 is shown in FIG. 2 as a single entity, this is for illustrative purposes only. In some implementations, controller 42 may include a plurality of processing units. These processing units may be physically located within the same device, or controller 42 may represent processing functionality of a plurality of devices operating in coordination. Controller 42 may be configured to execute computer program modules. Controller 42 may be configured to execute computer program modules by software; hardware; firmware; some combination of software, hardware, and/or firmware; and/or other mechanisms for configuring processing capabilities on controller 42.

It should be appreciated that although the components of RFID interrogator 21 are illustrated in FIG. 2 as being co-located within a single unit, in some implementations one or more of the components may be located remotely from the other components. The description of the functionality provided by the different components described herein is for illustrative purposes, and is not intended to be limiting, as any of the components may provide more or less functionality than is described. For example, one or more of the components may be eliminated, and some or all of its functionality may be provided by other ones of the components.

Figure 5:
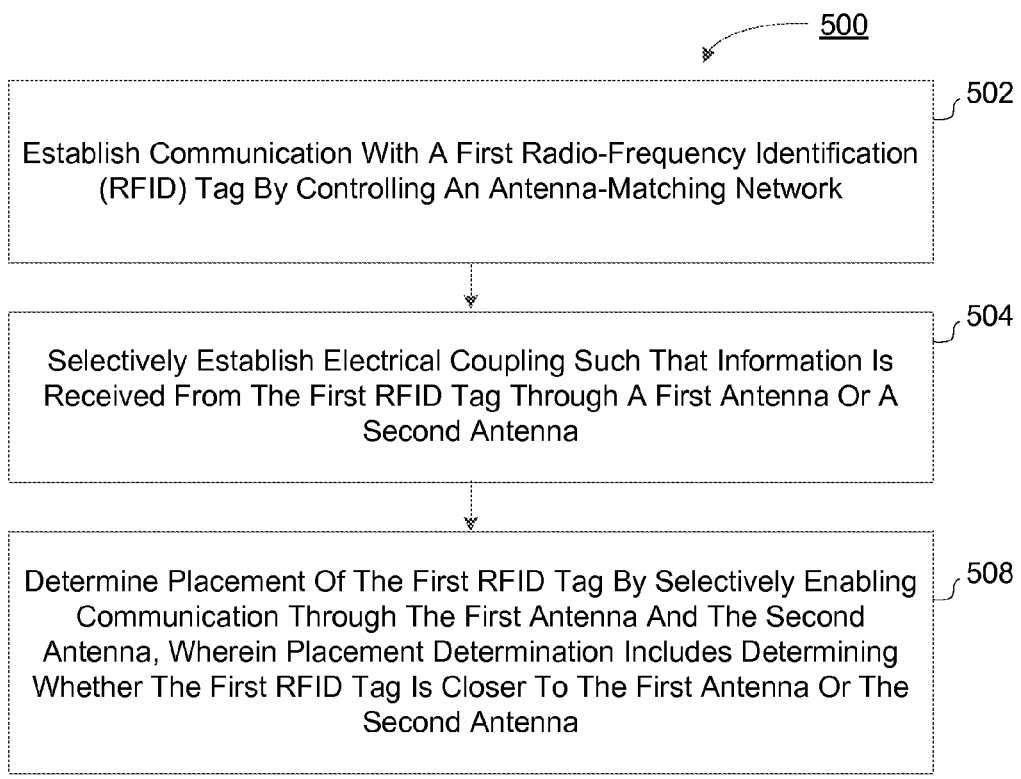
FIG. 5 illustrates a method for spatial recognition of RFID tag placement in accordance with one or more implementations.

FIG. 5 illustrates a method 500 for spatial recognition of RFID tag placement, in accordance with one or more embodiments. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a controller, a digital circuit designed to process information, an analog circuit designed to process information, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, communication is established (e.g. RF or NFC) with a first radio-frequency identification (RFID) tag by controlling an antenna-matching network. In some embodiments, operation 502 is performed by a RF reader circuit the same as or similar to RD reader circuit 44 (shown in FIG. 2 and described herein).

At an operation 504, electrical coupling is selectively established such that information is received from the first RFID tag through the first antenna or the second antenna. In some embodiments, operation 504 is performed by AC shorting circuit the same as or similar to first and second AC shorting circuit 47a and 47b (shown in FIG. 2 and described herein).

At an operation 508, placement of the first RFID tag is determined by selectively enabling communication through the first antenna and the second antenna, wherein placement determination includes determining whether the first RFID tag is closer to the first antenna or the second antenna. In some embodiments, operation 508 is performed by a controller the same as or similar to controller 42 (shown in FIG. 2 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system to determine spatial placement of one or more radio-frequency identification (RFID) tags using multiplexed antennae for Near Field Communication (NFC), the system comprising:
   a radio-frequency (RF) reader circuit having a receiver, the RF reader circuit being configured to establish NFC through radio-frequency identification (RFID) with a first radio-frequency identification (RFID) tag;
   an antenna-selecting component configured to selectively establish electrical coupling such that the RF reader circuit operates in one of the following states at a given time:
     a first state wherein the receiver is configured to receive information from the first RFID tag through a first antenna having a first location; or
     a second state wherein the receiver is configured to receive information from the first RFID tag through a second antenna having a second location;
   a controller configured to determine placement of one or more RFID tags by controlling the antenna-selecting component such that the controller is configured to determine whether placement of the first RFID tag is closer to the first location or the second location;
   one or more physical processors configured by machine-readable instructions to:
     associate individual ones of the one or more RFID tags with individual players of a video game based on the placement of individual ones of the one or more RFID tags, such that:
       the first RFID tag is associated with a first player of the video game based on the placement of the first RFID being closer to the first location, and
       the first RFID tag is associated with a second player based on the placement of the first RFID being closer to the second location;
   wherein the antenna-selecting component includes:
     a first alternating-current shorting circuit configured to selectively establish electrical coupling for alternating current between an antenna-matching network and the first antenna such that either i) information is received, at the receiver, from the first RFID tag through the first antenna, or ii) electrical coupling is selectively shorted; and
     a second alternating-current shorting circuit configured to selectively establish electrical coupling for alternating current between the antenna-matching network and the second antenna such that either i) information is received, at the receiver, from the first RFID tag through the second antenna, or ii) electrical coupling is selectively shorted; and
   wherein the controller is further configured to determine whether the placement of first RFID tag is closer to the first location or the second location by controlling the first alternating-current (AC) shorting circuit and the second alternating-current (AC) shorting circuit.

2. The system of claim 1, wherein the antenna-selecting component includes an antenna multiplexer configured to selectively provide communication with the first antenna and the second antenna.

3. The system of claim 1, further comprising:
   the first antenna and the second antenna; and
   the antenna-matching network configured to match electromagnetic properties of the first antenna and the second antenna.

4. The system of claim 1, wherein electrical coupling between the antenna-matching network and the first antenna is selectively shorted by disrupting resonance of the first antenna.

5. The system of claim 1, wherein electrical coupling between the antenna-matching network and the first antenna is selectively shorted by de-tuning the first antenna.

6. The system of claim 1, wherein electrical coupling between the antenna-matching network and the second antenna is selectively shorted by virtue of disrupting resonance of the second antenna and/or de-tuning the second antenna.

7. The system of claim 1, wherein the RF reader circuit is configured to establish NFC by controlling the antenna-matching network.

8. The system of claim 1, wherein the RF reader circuit is configured to establish NFC through one antenna at a time.

9. The system of claim 1, wherein the controller is configured to determine placement of one or more RFID tags by controlling the first AC shorting circuit and the second AC shorting circuit to selectively enable NFC via the antenna-matching network.

10. The system of claim 1, wherein the controller is further configured to control the RF reader circuit to transfer information from the antenna-matching network to the controller.

11. The system of claim 1, wherein the second alternating-current shorting circuit is configured to selectively establish electrical coupling for alternating current between the antenna-matching network and the second antenna having the second location such that either i) information is received from the second RFID tag through the second antenna, or ii) electrical coupling is selectively shorted, wherein the controller is further configured to determine whether the second RFID tag is closer to the first location or the second location.

12. The system of claim 1, further comprising:
   a third alternating-current shorting circuit configured to selectively establish electrical coupling for alternating current between the antenna-matching network and a third antenna having a third location such that either i) information is received from the first RFID tag through the third antenna, or ii) electrical coupling is selectively shorted, wherein the controller is configured to determine whether the first RFID tag is closer to the first location, the second location, or the third location.

13. The system of claim 1, wherein the information received from the first RFID tag includes information related to a game-related resource, and wherein the one or more physical processors are further configured by machine-readable instructions to:
   provide the game-related resource to the first player based on the first RFID tag being associated with the first player; and
   provide the game-related resource to the second player based on the first RFID tag being associated with the second player.

14. A computer-implemented method for determining spatial placement of one or more radio-frequency identification (RFID) tags using multiplexed antennae for Near Field Communication (NFC), the method comprising:

establishing NFC between a radio-frequency (RF) reader circuit comprising a receiver and a first radio-frequency identification (RFID) tag by controlling an antenna-matching network;

selectively establishing electrical coupling such that the RF reader circuit operates in one of the following states at a given time:
  a first state wherein the receiver is configured to receive information from the first RFID tag through a first antenna having a first location; or
  a second state wherein the receiver is configured to receive information from the first RFID tag through a second antenna having a second location; and determining placement of the first RFID tag by selectively enabling NFC through the first antenna and the second antenna, wherein placement determination includes determining whether the first RFID tag is closer to the first location or the second location;

associating individual ones of the one or more RFID tags with individual players of a video game based on the placement of individual ones of the one or more RFID tags, including:
  associating the first RFID tag with a first player of the video game when the first RFID is closer to the first location, and
  associating the first RFID tag with a second player when the first RFID is closer to the second location;

selectively establishing electrical coupling for alternating current between the antenna-matching network and the first antenna such that information is received, at the receiver, from the first RFID tag through the first antenna; and selectively establishing electrical coupling for alternating current between the antenna-matching network and the second antenna such that information is received, at the receiver, from the first RFID tag through the second antenna.

15. The method of claim 14, wherein selectively establishing electrical coupling is accomplished through an antenna multiplexer.

16. The method of claim 14, further comprising:
matching, by the antenna-matching network, electromagnetic properties of the first antenna and the second antenna.

17. The method of claim 14, wherein selectively establishing electrical coupling for alternating current between the antenna-matching network and the first antenna includes selectively shorting the electrical coupling by disrupting resonance of the first antenna.

18. The method of claim 14, wherein selectively establishing electrical coupling for alternating current between the antenna-matching network and the first antenna includes selectively shorting the electrical coupling by de-tuning the first antenna.

19. The method of claim 14, wherein establishing NFC is performed through one antenna at a time.

20. The method of claim 14, wherein determining placement of the first RFID tag by selectively enabling NFC via the antenna-matching network is accomplished by selectively controlling a first AC shorting circuit such that either i) information is received from the first RFID tag through the first antenna, or ii) electrical coupling for alternating current between the antenna-matching network and the first antenna is selectively shorted.

21. The method of claim 14, further comprising:
establishing NFC with a second radio-frequency identification (RFID) tag by controlling the antenna-matching network;

selectively establishing electrical coupling for alternating current between the antenna-matching network and the first antenna such that information is received from the second RFID tag through the first antenna;

selectively establishing electrical coupling for alternating current between the antenna-matching network and the second antenna such that information is received from the second RFID tag through the second antenna; and determining placement of the second RFID tag by selectively enabling NFC via the antenna-matching network, wherein placement determination includes determining whether the second RFID tag is closer to the first location or the second location.

22. The method of claim 21, wherein establishing NFC with the first RFID tag includes identifying the first RFID tag, and wherein establishing NFC with the second RFID tag includes identifying the second RFID tag.

23. The method of claim 21, further comprising:
selectively establishing electrical coupling for alternating current between the antenna-matching network and a third antenna having a third location such that information is received from the first RFID tag through the third antenna;

establishing NFC with the second RFID tag by controlling the antenna-matching network; and selectively establishing electrical coupling for alternating current between the antenna-matching network and the third antenna such that information is received from the second RFID tag through the third antenna;

wherein placement determination includes determining whether the first RFID tag is closer to the first location, the second location, or the third location, and wherein placement determination includes determining whether the second RFID tag is closer to the first location, the second location, or the third location.

24. The method of claim 14, wherein the information received from the first RFID tag includes information related to a game-related resource, and wherein the method further comprises:
providing the game-related resource to the first player based on the first RFID tag being associated with the first player; and providing the game-related resource to the second player based on the first RFID tag being associated with the second player.

* * * * *